July 14, 1942.   J. R. WEBER   2,289,397
PHOTOGRAPHIC ELEMENTS HAVING REMOVABLE ANTIHALATION LAYERS
Filed Dec. 26, 1939
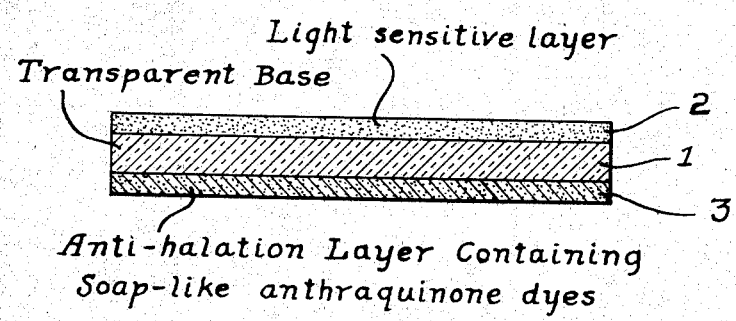
John Rau Weber.
Inventor
By Lynn B. Morris
Attorney Patented July 14, 1942

2,289,397

UNITED STATES PATENT OFFICE 2,289,397

PHOTOGRAPHIC ELEMENT HAVING REMOVABLE ANTIHALATION LAYERS

John Rau Weber, South River, N. J., assignor, by mesne assignments, to E. I. du Pont de Nemours & Company, Wilmington, Del., a corporation of Delaware Application December 26, 1939, Serial No. 311,041

5 Claims. (Cl. 95—9)

This invention relates to novel anti-halation layers for photographic elements. More particularly it relates to light sensitive photographic film elements bearing a removable anti-halation layer composed of a high molecular weight binding agent and a dye which exhibits soap-like properties.

The invention has for an object the preparation of a new and improved anti-halation photographic element. A further object is the preparation of improved removable anti-halation layers which do not require the presence of surface-active agents to facilitate their removal.

This invention has for a further object the preparation of photographic elements which bear an anti-halation layer which may be readily removed in aqueous baths. A further object is the preparation of anti-halation layers which do not form colored particles upon being mechanically stressed. A still further object is the production of anti-halation layers which are stable upon storage under humid conditions and do not deteriorate or become tacky. A still further object is the preparation of photographic films which do not affect the sensitivity of photographic film emulsion layers in contact therewith. Still further objects will appear hereinafter.

The above and other objects are accomplished by the following invention by the use of anti-halation layers composed of a water-soluble high molecular weight binding agent and a water-soluble dye having soap-like properties.

The water-soluble soap-like dyes which have been found to have considerable utility in anti-halation layers in accordance with this invention have sometimes been referred to as soap-like wool dyes. Some of these dyes are recent in origin. So far as I am aware they have been used for a few selected textile uses only. They are not confined to any one specific class of compounds, but on the contrary, are quite diverse in character. Thus, they may be polyaryl methane, azine, xanthene, acridine, anthraquinone, thiazine, etc., and azo dyestuffs.

The dyes in general contain at least one and preferably a plurality of benzene nuclei. One or more benzene nuclei in general contain one or more solubilizing groups, preferably sulfonic acid groups. The benzene generally contain a substituted or unsubstituted hydrocarbon radical of the aliphatic or alicyclic series. These groups produce substantivity. The hydrocarbon radicals may be directly joined to the benzene nuclei or through various bridging radicals, e. g. amide linkages including carboxylic acid amide and sulfonic acid amide linkages. The radicals may vary considerably in carbon content, for instance, from 6 to 20 or more carbon atoms, and preferably from 12 to 18 carbon atoms.

A preferred class of soap-like dyes are the polyaryl methanes, especially triphenyl methane dyes. The condensation product of rosaniline-trisulfonic acid with lauric acid chloride is representative of this class of dyes. The lauroyl group may be substituted by other carboxylic acid acyl groups, e. g. of fatty acids of 12 to 18 carbon atoms, or with the corresponding sulphonyl radicals from long chain saturated aliphatic sulfonic acids of 12 to 18 carbon atoms. Other specific suitable dyes of this and other types are disclosed in British Patent 393,966.

Suitable anthraquinone dyestuffs wherein the long chain hydrocarbon radical is attached to a carboxyl group are described in U. S. Patent 2,100,392. These compounds have the general formula:

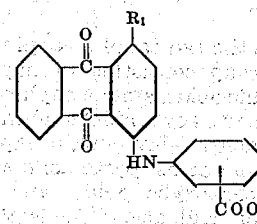

wherein $R_1$ stands for a substituent taken from the class consisting of OH, amino and alkylamino, $R_2$ is an alkyl or alkenyl radical of 8 to 20 carbon atoms, preferably 12 to 18 carbon atoms, and in which there is at least one sulfonate group. By sulfonate group is meant free sulfonic acid group or a water soluble salt thereof.

Specific dyes of the above type are 1-amino-4-m-carbododecoxyanilinoanthraquinone-2-sulfonic acid, 1-amino-4-o-carbododecoxyalinoanthraquinone-2-sulfonic acid, 1-methyl-amino-4-o-carbododecoxyanilinoanthraquinonesulfonic acid, 1-amino-2-methyl-4-o-carbododecoxyanilinoanthraquinonesulfonic acid, 1-amino-2-methyl-4-o-carbododecoxyanilinoanthraquinone, 1-amino-4-m-carbodecyloxyanilinoanthraquinone-2-sulfonic acid, 1-amino-4-m-carbooleyloxyanilinoanthraquinone-2-sulfonic acid, 1-hydroxy-4-m-carboxyanilinoanthraquinone-2-sulfonic acid, 1-hydroxy-4-m-carboxyanilinoanthraquinone-2-sulfonic acid, 2-bromo-1-amino-4-m-carbododecoxyanilinoanthraquinone-6-sulfonic acid, and 1-amino-4-carbododecoxyanilinoanthraquinone-2:6-disulfonic acid.

A further class of suitable and somewhat related anthraquinone type dyes in which the long chain aliphatic hydrocarbon radicals are attached directly to an aromatic hydrocarbon nucleus are described in U. S. Patent 2,100,392. These dyes have the general formula:

wherein $A_q$ stands for an anthraquinone radical; X stands for a linking radical of the class consisting of —NH—, —O— and —S—; R′ is an arylene radical of the class consisting of phenylene, naphthalene and acenaphthylene, and R is a long chain alkyl or alkenyl group of 8 to 20 and preferably 12 to 18 carbon atoms which are further characterized in that at least one aromatic nucleus contains at least one sulfonic acid group.

Specific dye compounds of the last-mentioned type include, 2-sulfonic-1-amino-4-(p-dodecyl) anilinoanthraquinone, 2-sulfonic-1-amino-4-(p-cetylanilino)-anthraquinone and p-dodecylanilinoanthraquinonesulfonic acid, and their further sulfonated derivatives.

In the accompanying drawing a transparent support 1 has imposed on one face thereof a light-sensitive layer 2, on the reverse face of this support is imposed an antihalation layer 3 consisting of a binding agent having disposed therethrough as an antihalation material a soap-like anthraquinone type antihalation dye.

A still further class of suitable dyes are the azo type dyes which contain a long chain alcohol hydrocarbon radical attached to a carboxyl group and are described in U. S. Patent 2,155,493. These dyes have the general formula:

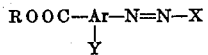

wherein X is the radical of a coupling component from the group consisting of naphthol mono- and di-sulfonic acids, amino-naphthol mono- and di-sulfonic acids, acylamino-naphthol mono- and di-sulfonic acids, alkyl-amino-naphthol mono- and di-sulfonic acids, pyrazolone sulfonic acids, pyrazolone carboxylic acids, and the halogen derivatives of said acids; Ar is the residue of benzene; Y is one of a group consisting of hydrogen, methyl, methoxy and chloro; and R is a long chain aliphatic hydrocarbon radical of 8 to 20 and preferably 12 to 18 carbon atoms.

Specific dyes of the type just described may be made from the following components:

| Diazo component | Coupling component |
| --- | --- |
| Cetyl-m-aminobenzoate | 1-amino-8-naphthol-3:6-disulphonic acid. |
| Dodecyl-3-amino-4-methoxy-1-benzoate. | 2-N-β-hydroxyethylamino-8-naphthol-6-sulphonic acid (alkaline coupled). |
| Do | 1 (2':5'-dichloro-4'-sulphophenyl)-3-methyl-5-pyrazolone. |
| Do | 1-naphthol-3:6-disulphonic acid. |
| Do | 1-(4'-sulphophenyl)-5-pyrazolone-3-carboxylic acid. |
| Do | 1-(4'-sulphophenyl)-3-methyl-5-pyrazolone. |
| Do | 1-benzoylamino-8-naphthol-3:6-disulphonic acid. |
| Do | 1-acetamino-8-naphthol-4:6-disulphonic acid. |
| Do | 2-N-acetyl-N-β-hydroxy-ethyl-amino-8-naphthol-6-sulphonic acid. |
| Dodecyl-2-chloro-5-amino-1-benzoate. | 1-acetamino-8-naphthol-4:6-disulphonic acid. |
| Do | 1-naphthol-3:6-disulphonic acid. |
| Decyl-p-amino-benzoate | 1-acetamino-8-naphthol-4:6-disulphonic acid. |
| Dodecyl-3-amino-4-methoxy-1-benzoate. | 1-naphthol-3:6-disulphonic acid. |
| Do | 1 (4'-sulphophenyl)-5-pyrazolone-3-carboxylic acid. |
| Do | 1-acetamino-8-naphthol-4:6-disulphonic acid. |

The particular dye or mixture of dyes chosen, of course, depends upon the exact nature of the photographic emulsion and the use to which it is to be put. In general, the dye or mixture of dyes must be absorptive of the rays to which the photographic emulsion is sensitive. Suitable colors include blue, green, yellow, magenta and red; either singly or in combinations to produce black, deep blue, green and red dyes. Halation of blue sensitive and orthochromatic emulsions can be minimized by the use of black and red non-halation layers. Panchromatic emulsions, theoretically, require black non-halation layers although green and deep blue can be used advantageously. Mixtures of dyes to produce various shades are sometimes desirable.

The binding agents for the anti-halation layers as previously stated can be water soluble proteins, e. g. gelatine, water-soluble cellulose derivatives including water-soluble cellulose ethers, e. g. methyl cellulose, ethyl cellulose, etc., water-soluble cellulose esters including the water-soluble salts of the dicarboxylic acid esters of cellulose, e. g. the alkali metal ammonium and lower alkyl and mono, di and tri-ethanolamine salts of cellulose phthalate, cellulose acetate phthalate, cellulose succinate; and the same salts of cellulose glycollate, cellulose diglycollate, etc.; polyvinyl alcohol; partially hydrolyzed polyvinyl esters; polymeric amino-nitrogen containing bodies of Dawson Serial No. 245,528, filed December 13, 1938; water-soluble salts of polyglucuronic acid, e. g. ammonium polyglucuronate. Protective coatings may in some instances be added, such as rosin, casein, etc., if desired.

The binding agents are dissolved in an aqueous or aqueous-organic solvent bath and the dye of the above-described type which exhibits soap-like properties added thereto preferably from a solvent solution. The resulting coating solution is then coated on the support of the photographic element and dried. The dye is of such tinctorial strength or is added in sufficient amounts to stop the passage of light rays. The coating solution may be water alone or water in admixture with a water-miscible solvent such as methanol, ethanol, acetone, etc. In general, the dye is first dissolved in the organic solvent.

The solution may be coated upon the back of the transparent plate or film support by any of the conventional methods, dipping, transfer or beading rollers, spraying, immersion, beading, etc. In general a very thin layer upon the order of 0.5 to 20μ is sufficient for the purpose.

The invention will be further understood but is not intended to be limited by the following examples:

*Example I*

A coating solution having the following composition:

Water _____ ccs__ 800
Ethyl alcohol _____ ccs__ 200
Ethyl cellulose _____ grams__ 20
Palmitoyl-amino-phenonaphthazoxonium-sodium-disulphonate _____ grams__ 16 was prepared by adding the ethyl cellulose to water and then the dye with agitation. The blue dye was first dissolved in ethanol. The slightly viscous mixture obtained thereby was coated on to the reverse side of a transparent cellulose nitrate film base which carried upon its face a panchromatic emulsion, by means of a beading roller and allowed to dry.

The resulting film was smooth, uniform, and free from repellent spots and coating streaks. It was found to have excellent anti-halation characteristics and was free from tackiness. It was readily removable in alkaline developer baths.

Similar amounts of the following give similar results: lauroyl-rosaniline-trisulfonic acid sodium salt (purple), the addition product of dimethylsulfate to lauroyl neutral red (red), myristoyl-fluorescein-tetra sulfonic acid sodium salt (yellow) and undecyl asymm-dimethyl-thionine (blue).

Example II

A coating solution of the following composition:

| | |
|---|---|
| Cellulose glycollate | grams__ 25 |
| Lauroyl-rosaniline-sodium trisulphonate | grams__ 40 |
| Water | cubic centimeters__ 3500 |
| Alcohol | do____ 500 | was prepared in a similar manner to Example I and similarly coated upon a cellulose acetate film base which contained on its face a panchromatic emulsion. The film had the same properties and characteristics as that described in Example I.

Example III

A coating solution having the following composition:

| | |
|---|---|
| Water | cubic centimeters__ 300 |
| Gelatine | grams__ 15 |
| 2-sulfonic-1-amino-4-(p-cetyl-aniline)-anthraquinone | grams__ 3 | was prepared in the following manner. Fifteen grams of gelatine were swollen in cold water, subsequently melted and then the liquid volume made up to 300 ccs. with additional warm water and the dye added with agitation. The dye was first dissolved in a little ethanol. The slightly viscous mixture obtained thereby was coated on to the back side of a transparent cellulose nitrate film base which carried upon its face a panchromatic emulsion, by means of a beading roller and allowed to dry.

The resulting film was smooth, uniform and free from repellent spots and coating streaks. It was found to have excellent anti-halation characteristics and was free from tackiness. The layer was removed in an alkaline metol-hydroquinone developing solution.

In place of the specific soap-like dye described in this and the following examples may be substituted any suitable dye herein described or referred to.

Example IV

| | |
|---|---|
| Polyvinyl alcohol | grams__ 40 |
| Dye prepared from cetyl-m-amino-benzoate and 1-amino-8-naphthol-3,6-di-sulfonic acid | grams__ 40 |
| Water | cubic centimeters__ 2000 |
| Alcohol | do____ 500 |

The polyvinyl alcohol and dye were added to the water, alcohol mixture. The slightly viscous mixture obtained thereby was coated on to the reverse side of a transparent cellulosic film base which contained upon its face a panchromatic emulsion, by means of a beading roller and allowed to dry.

The resulting film was very smooth and uniform and free from coating streaks and repellent spots. It was found to have excellent anti-halation characteristics and was free from tackiness. The anti-halation layer, after exposure of the film, was rapidly dissolved from the film base by ordinary metol-hydroquinone-carbonate developers.

The dye or mixture as stated above to be used in any specific instance is primarily determined by the light sensitivity of the emulsion. Such emulsions are usually gelatin silver halide, e. g. silver chloride, silver bromide, silver iodide, silver chloride-bromide, silver bromide-iodide, etc. emulsions which contain sensitizers such as cyanine, carbocyanine, pseudo-cyanine, cyazine bases and salts. That is, it must be absorptive of light of the wave lengths to which the emulsion is predominately sensitive. In general the dye should be added in an amount sufficient to give a photometric density of 0.8 or the amount of dyed layer should be sufficient to give such a density.

The soap-like dyes have a number of decided advantages in antihalation coatings. Since they are substantive to various binders and especially to gelatine, they will not migrate to a gelatine emulsion in close contact with the non-halation backing. This is of importance when film is spooled in rolls including daylight loading film, or packed in sheets face-to-face.

A further advantage results from their soap like nature whereby they act as a surface lubricant to reduce friction and contact potential when in contact with an adjacent emulsion layer. Thus, their use aids in reducing static marks.

The surface-active nature of the soap-like dyes aids considerably in the penetration of developers, thus facilitating the discharging of the dye. It also aids in the prompt removal of the layer.

As many apparently widely different embodiments of this invention may be made without departing from the spirit and scope thereof, it is to be understood that I do not limit myself to the specific embodiments herein except as defined by the appended claims.

I claim:

1. A photographic element comprising a transparent base, a gelatino silver halide emulsion on one side of the base and an anti-halation layer on the other side of the base composed of a water soluble high molecular weight binding agent and a dye having soap-like properties which is absorptive of the rays to which the coating is sensitized having the general formula:

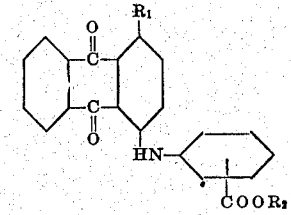

wherein $R_1$ is a member of the group consisting of —H, —OH, —NH$_2$ and alkylamino, $R_2$ is a hydrocarbon radical taken from the class consisting of alkyl and alkenyl radicals of 8 to 20 carbon atoms, at least one of the benzene nuclei containing a sulfonate group.

2. A photographic element comprising a transparent base, a gelatino silver chloride emulsion on one side of the base and an anti-halation layer on the other side of the base composed of a water soluble high molecular weight binding agent and a dye having soap-like properties which is absorptive of the rays to which the coating is sensitized having the general formula:

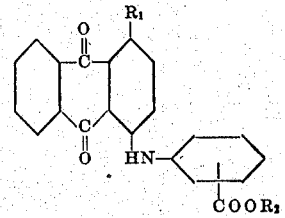

wherein $R_1$ is a member of the group consisting of —H, —OH, —NH₂ and alkylamino, R₂ is a hydrocarbon radical taken from the class consisting of alkyl and alkenyl radicals of 8 to 20 carbon atoms, at least one of the benzene nuclei containing a sulfonate group.

3. A photographic element comprising a transparent base, a gelatino silver halide emulsion on one side of the base and an anti-halation layer on the other side of the base composed of a water-soluble high molecular weight binding agent and a dye having soap-like properties which is absorptive of the rays to which the coating is sensitized having the general formula:

Aq—X—R'—R wherein Aq is an anthraquinone radical, X is a linking radical taken from the class consisting of —NH—, —O—, and —S—; R' is an arylene radical taken from the class consisting of phenylene, naphthalene and acenaphthalene and R is a hydrocarbon radical taken from the class consisting of alkyl and alkenyl radicals of 8 to 20 carbon atoms, at least one of the benzene nuclei containing a sulfonate group.

4. A photographic element comprising a transparent base, a gelatino silver chloride emulsion on one side of the base and an anti-halation layer on the other side of the base composed of a water-soluble high molecular weight binding agent and a dye having soap-like properties which is absorptive of the rays to which the coating is sensitized having the general formula:

Aq—X—R'—R wherein Aq is an anthraquinone radical, X is a linking radical taken from the class consisting of —NH—, —O—, and —S—; R' is an arylene radical taken from the class consisting of phenylene, naphthalene and acenaphthalene and R is a hydrocarbon radical taken from the class consisting of alkyl and alkenyl radicals of 8 to 20 carbon atoms, at least one of the benzene nuclei containing a sulfonate group.

5. A photographic element comprising a transparent base, a gelatino silver halide emulsion on one side of the base and an anti-halation layer on the other side of the base composed of a water-soluble high molecular weight binding agent, and a dye having soap-like properties which is absorptive of the rays to which the coating is sensitized having the general formula:

$$\underset{Y}{ROOC-Ar-N=N-X}$$

wherein X is the radical of a coupling component from the group consisting of naphthol mono- and di-sulfonic acids, amino-naphthol mono- and di-sulfonic acids, acylamino-naphthol mono- and di-sulfonic acids, alkyl-amino-naphthol mono- and di-sulfonic acids, pyrazolone sulfonic acids, pyrazolone carboxylic acids, and the halogen derivatives of said acids; Ar is the residue of benzene; Y is one of a group consisting of hydrogen, methyl, methoxy and chloro; and R is a long chain aliphatic hydrocarbon radical of 8 to 20 and preferably 12 to 18 carbon atoms.

JOHN R. WEBER.